United States Patent
Reynolds et al.

[15] 3,696,470
[45] Oct. 10, 1972

[54] PLASTIC FASTENER AND METHOD OF SECURING SAME TO MATERIAL

[72] Inventors: Rolfe E. Reynolds; Alfred E. Carlile, both of Meadville, Pa.

[73] Assignee: Textron Inc.

[22] Filed: Dec. 8, 1969

[21] Appl. No.: 882,979

[52] U.S. Cl..........................24/90, 85/37, 24/208 A
[51] Int. Cl..............................................A44b 1/18
[58] Field of Search..........24/90, 94, 96, 101, 208 A, 24/217, 150, 216; 85/37

[56] References Cited

UNITED STATES PATENTS

| | | |
|---|---|---|
| 3,416,196 | 12/1968 | Mathison.......................24/90 |
| 405,529 | 6/1889 | Bryant...........................24/90 |
| R23,624 | 2/1953 | Sutin........................24/90 RP |
| 3,505,923 | 4/1970 | Neill..............................85/37 |

Primary Examiner—Bobby R. Gay
Assistant Examiner—Garry Moore
Attorney—Meech & Field

[57] ABSTRACT

A plastic, single component, button-type fastener having a button portion with a smaller collar and a slender neck extending from the collar to a tapered stem, the tapered stem having a pointed end and a lower surface defining an undercut around the neck with an upper surface of the collar. A method of securing the above described fastener to a piece of material including forcing the stem through the piece of material to position the material in the undercut, cold-heading the stem and partially shearing the cold-headed stem.

2 Claims, 3 Drawing Figures

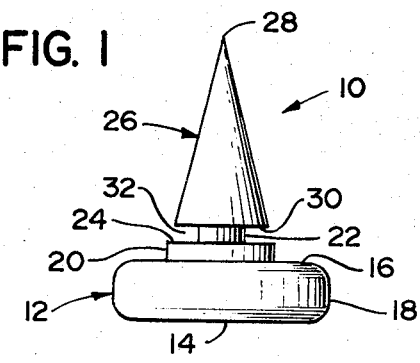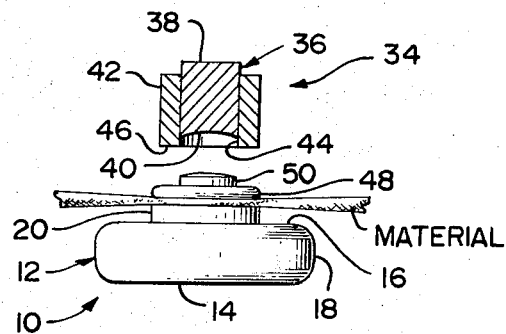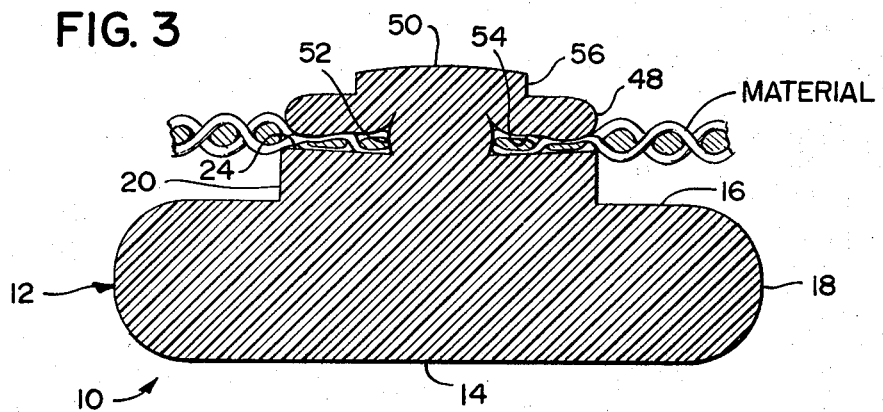

PLASTIC FASTENER AND METHOD OF SECURING SAME TO MATERIAL

BACKGROUND OF THE INVENTION

1. Field of the Invention

The present invention pertains to plastic fasteners and more particularly to plastic, button-type fasteners which may be secured to material without the use of threads or stitching and a method of securing such plastic fasteners to material.

2. Description of the Prior Art

Fasteners of the button or stud type for insertion in a buttonhole in a garment to fasten two pieces thereof together are widely utilized. Such fasteners conventionally are disc-shaped with a central portion having a plurality of apertures therein for receiving thread which is stitched into the material to secure the fastener thereto. The use of threads in securing button-type fasteners to material has the disadvantage of requiring intricate and costly apparatus for automatic stitching in the home and in industry; and, furthermore, threads have a tendency to fray and loosen thereby requiring frequent replacement of the button-type fasteners. The frequent loss and replacement of button-type fasteners is a source of constant bother to the housewife especially since the threads are subject to great tensile forces when the two pieces of the garment are separated without properly pushing the button-type fastener through the buttonhole. Another disadvantage in the use of threads for securing button-type fasteners is that tensile stress on the threads tends to crinkle thin, synthetic, lightweight materials. The disadvantages of conventional, thread-secured, button-type fastener that may be secured to material without the use of threads.

There have been many attempts to provide button-type fasteners of a nature to permit their simple an easy securing to material to not only aid the housewife in replacing such fasteners and in initially securing such fasteners to homemade garments but also to facilitate the securing of such fasteners to mass produced garments. All previous attempts to overcome the disadvantages of securing fasteners to material with thread have failed in that they normally require a securing step tantamount to that of stitching. That is, attempts to overcome the disadvantages of using thread to secure button-type fasteners have centered around the continued use of conventional button-type fasteners with changed securing means, such as crimpable nylon filaments. Thus, some sort of securing element must be inserted through the apertures in the fastener and the material; and, accordingly, the disadvantages of time consuming attachment and the requirement of "threading" have not been obviated.

The problems to be overcome in providing a button-type fastener without the disadvantages of thread-secured fasteners are manifold and have prevented the construction of a suitable replacement for the conventional thread-fastened, button-type fastener despite the many attempts. Some of the problems involved are that button-type fasteners must be capable of being formed in a myriad of sizes, shapes and colors in order that they may be matched with the many materials utilized in garments, that fasteners of this type must be secured to material in a manner such that the material is not damaged, that the securing of such fasteners to material must be an extremely simple step to permit full utilization throughout industry as well as by housewives, and that such fasteners must be firmly secured to the material to avoid inadvertent loss.

In order to provide button-type fasteners capable of being formed in many sizes, shapes and colors, it is desirable to manufacture the fasteners of a plastic material, such as nylon. The use of nylon, however, presents a problem in that the memory of the nylon prevents securing of the fastener to material by any simple and quick method. Accordingly, attempts have been made to utilize heat in deforming a fastener to secure the fastener to material; however, the use of heat not only complicates the steps necessary to properly secure the fastener to the material but further provides the disadvantage of possible deformation and injury to the material and/or the fastener during the securing process.

SUMMARY OF THE INVENTION

Accordingly, it is an object of the present invention to form a plastic, button-type fastener which may be secured to material without the use of threads, thread equivalents, or heat.

The present invention is generally characterized in a plastic, single component, button-type fastener having a button portion, a neck portion extending from the button portion, and tapered stem portion having a pointed end and an end connected with the neck portion and having a greater width than the neck portion to define an undercut whereby the stem portion may be inserted through material to capture the material in the undercut.

Another object of the present invention is to construct a button-type fastener that has a stem for insertion through material without damaging the material.

A further object of the present invention is to secure a plastic, button-type fastener to material by flattening a stem of the fastener and then partially shearing the flattened stem to destroy the memory of the plastic.

The present invention has another object in that a button-type fastener has a tapered stem and a neck portion forming an undercut to capture material to which the fastener is to be secured.

A further object of the present invention is to shape a plastic, single component, button-type fastener such that the fastener may be cold-headed to firmly grasp material to which the fastener is to be secured without rubbing.

Some of the advantages of the button-type fastener of the present invention over prior art fasteners are that the button-type fastener can by secured to material without threads or "threading," that the button-type fastener can be easily secured to material with a hand tool and without the use of heat, that the button-type fastener has great strength and is firmly secured, and that the button-type fastener is suitable for use with mass produced garments.

Other objects and advantages of the present invention will become apparent from the following description of the preferred embodiment as shown in the accompanying drawing.

BRIEF DESCRIPTION OF THE DRAWINGS

FIG. 1 is a side elevation of a button-type fastener according to the present invention.

FIG. 2 is a side elevation of the button-type fastener of FIG. 1 in alignment with an attaching tool after attachment of the fastener to a piece of material.

FIG. 3 is an enlarged section of the attached button-type fastener of FIG. 2.

DESCRIPTION OF THE PREFERRED EMBODIMENT

A button-type fastener 10 according to the present invention is illustrated in FIG. 1 and is preferably formed as a single component of a plastic material, such as nylon. Fastener 10 has an annular button portion 12 having an outer face 14, a planar inner face 16 joined by an arcuate edge 18, and a cylindrical collar 20 centrally disposed on inner face 16 and having a diameter smaller than the diameter of the flat portion of inner face 16.

A slender, cylindrical neck portion 22 extends coaxially from a flat upper surface 24 of collar 20 to a conical stem 26 which tapers to a pointed end 28. Stem 26 has a flat lower surface 30 which is in parallel with upper surface 24 of collar 20 to define a annular undercut 32 for receiving material to which fastener 10 is to be secured.

In order to secure fastener 10 to a piece of material, pointed end 28 is positioned adjacent the desired location of fastener 10 on the material. By applying a slight pressure to the fastener, pointed end 28 pierces the material, and the fastener is then forced through the material until the material snaps into undercut 32. It should be appreciated that the tapered shape of stem 26 permits the fastener to be self-piercing and thereby obviates the use of an additional piercing element such as the needle required to pull thread through material.

Once fastener 10 has pierced the material, stem 26 is cold-headed with any suitable attaching tool, such as the tool 34 partially illustrated in FIG. 2. Tool 34 includes a stationary cylindrical pressure block 36 which has an upper end 38 adapted to be secured to any suitable force transmitting member such as the movable handle of a plier-like hand tool and a slightly concave pressure surface 40 adapted to engage stem 26. A cylindrical shearing sleeve 42 is coaxially and slidably mounted around pressure block 36 and has an inner surface 44 acting as a shearing edge and a flat annular pressure surface 46. Shearing sleeve 42 is adapted to be operatively attached to the force transmitting member to move individually in relation to pressure block 36.

The cold-heading of stem 26 is a two-step process. Pressure block 34 is first forced against stem 26 such that concave pressure surface 40 quickly smashes the stem into a flattened, slightly convex form, and thereafter shearing sleeve 42 is moved axially along pressure block 36 against the flattened stem. Shearing sleeve 42 is moved past pressure surface 40 of pressure block 42 to complete the forming of a securing head for the fastener in a manner such that annular pressure surface 46 forms an outer rim 48 for the securing head. Outer rim 48 surrounds a central protrusion 50 formed by the partial shearing action of inner surface 44 against the flattened stem as the leading edge of inner surface 44 moves past concave pressure surface 40. The shearing action destroys the memory of the plastic and sets or stress relieves the cold-formed head.

As may be more clearly appreciated from FIG. 3, the cold-heading of stem 26 causes neck 22 to bulge and assume a barrel-like shape 52 to more firmly contact the material in annular undercut 32. Furthermore, the pressure during cold-heading forces outer rim 48 of the cold-formed head toward upper surface 24, as shown at 54, to decrease annular undercut 32 and firmly grasp the material. This is extremely advantageous in that it prevents movement of fastener 10 with respect to the material to thereby prevent fraying of the material from rubbing against the fastener. Accordingly, it can be seen that the fastener of the present invention is prevented from inadvertent loss. The sheared edge 56 of central protrusion 50 is formed relatively slowly with respect to the initial smashing of stem 26 such that radial cold flow is permitted to form the head and to completely destroy the memory of the plastic.

The surface of fastener 10 prior to cold-heading, as shown in FIG. 1, is uniquely responsible for the strength of the attached fastener and the ease with which the fastener is secured to material. The pointed end 28 permits initial piercing of the material without severing the threads, and the tapered shape of stem 26 allows the stem 26 to be fully inserted without damage to the material. The tapered shape of stem 26 also facilitates flattening of the stem since the pointed end does not exhibit a great resistance to change thereby increasing the ease with which the fastener may be secured to material. The annular undercut 32 permits the material to snap back to its initial form and be captured around neck 22. The lower surface 30 of stem 26, which eventually forms outer rim 48, is aligned with the upper surface 24 of collar 20 such that pressure during cold-heading is evenly distributed, and the diameters of upper surface 24 of collar 20 and lower surface 30 of stem 26 are much greater than the diameter of neck 22 to provide a substantial undercut 32. The diameter of collar 20 is small enough to be received in a buttonhole, and outer surface 14 of button portion 12 may have any desired shape or design for aesthetic appeal.

Inasmuch as the present invention is subject to many variations, modifications and changes in detail, it is intended that all matter contained in the foregoing description or shown in the accompanying drawing shall be interpreted as illustrative and not in a limiting sense.

What is claimed is:

1. A one-piece plastic button for button holes on garment material and the like comprising
    a button portion having a first width and having rounded edges adapted for easy insertion and removal during a buttoning movement,
    a collar extending from said button portion and having a second width less than said first width and having an upper surface for contacting one side of a material,
    a neck portion having a third width less than said second width and extending from said collar through the material,
    a head portion having a tapered stem portion extending from said neck portion for insertion through the material and being deformed into top and lower surfaces with an outer rim therebetween,
    the lower surface contacting another side of the material and the outer rim having a width greater than said third width, and said outer rim being displaced toward said collar causing the material to be firmly grasped between the upper surface of said collar and the lower surface of said head portion whereby movement of said neck portion and said upper and lower surfaces is precluded relative to the material.

2. The invention as recited in claim 1 wherein said head portion includes sheared edge means defining a protrusion centrally extending from the top surface of said head portion.

* * * * *